(12) United States Patent
Lee

(10) Patent No.: US 12,526,209 B1
(45) Date of Patent: Jan. 13, 2026

(54) NETWORK DEVICE AND METHOD FOR SEARCHING FOR EDGE SERVICE IMPLEMENTED IN NETWORK DEVICE

(71) Applicant: SK TELECOM CO., LTD., Seoul (KR)

(72) Inventor: Dong Jin Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 1175 days.

(21) Appl. No.: 17/434,490

(22) PCT Filed: Jun. 19, 2020

(86) PCT No.: PCT/KR2020/007997
§ 371 (c)(1),
(2) Date: Aug. 27, 2021

(87) PCT Pub. No.: WO2020/256484
PCT Pub. Date: Dec. 24, 2020

(30) Foreign Application Priority Data

Jun. 19, 2019 (KR) .......................... 10-2019-0072947

(51) Int. Cl.
*H04L 41/50* (2022.01)
*H04W 24/02* (2009.01)

(52) U.S. Cl.
CPC ......... *H04L 41/5058* (2013.01); *H04W 24/02* (2013.01)

(58) Field of Classification Search
None
See application file for complete search history.

(56) References Cited

U.S. PATENT DOCUMENTS

| 8,675,488 B1 * | 3/2014 | Sidebottom ........... H04L 67/141 370/235 |
| 8,948,001 B2 * | 2/2015 | Guichard ............ H04L 41/5025 370/242 |

(Continued)

FOREIGN PATENT DOCUMENTS

| CN | 101919209 | 12/2010 |
| CN | 104221426 | 12/2014 |

(Continued)

OTHER PUBLICATIONS

Huawei et al: "New Solution for KI8 and KI extension: Support for MEC topology exposure for efficient UPF anchor selection", 3GPP Draft; S2-188308 was 6838 New Solution for KI8 and KI Extension_R0, 3rd Generation Partnership Project (3GPP), Mobile Competence Centre; 650, Route Des Lucioles; F-06921 Sophia-Antipolis Cedex, vol. SA WG2, No. Sophia Antipolis, France; Aug. 20, 2018-Aug. 24, 2018 Aug. 14, 2018 (Aug. 14, 2018); XP051537217.

(Continued)

*Primary Examiner* — Phyllis A Book
(74) *Attorney, Agent, or Firm* — KED & ASSOCIATES, LLP

(57) ABSTRACT

The present disclosure proposes a novel solution (technology) for achieving a service environment in which an edge service applicable to a subscriber in a control plane (control node) can be searched for and selected by searching for the edge service in UPF in response to a request of the control plane (control node).

14 Claims, 8 Drawing Sheets

(56) References Cited

U.S. PATENT DOCUMENTS

| | | | | |
|---|---|---|---|---|
| 10,848,403 | B1* | 11/2020 | Schroeder | H04L 43/106 |
| 12,284,252 | B2* | 4/2025 | Kim | H04L 67/51 |
| 2007/0115962 | A1* | 5/2007 | Mammoliti | H04L 41/0806 |
| | | | | 370/389 |
| 2012/0281540 | A1* | 11/2012 | Khan | H04L 45/308 |
| | | | | 370/328 |
| 2014/0355436 | A1* | 12/2014 | Zhang | H04L 43/0882 |
| | | | | 370/232 |
| 2015/0207677 | A1* | 7/2015 | Choudhury | H04L 45/42 |
| | | | | 370/254 |
| 2015/0271102 | A1* | 9/2015 | Antich | H04L 47/805 |
| | | | | 370/230 |
| 2015/0381515 | A1* | 12/2015 | Mattson | H04L 47/83 |
| | | | | 707/722 |
| 2016/0094398 | A1* | 3/2016 | Choudhury | H04L 45/42 |
| | | | | 370/254 |
| 2019/0140919 | A1* | 5/2019 | Smith | H04L 9/50 |

FOREIGN PATENT DOCUMENTS

| | | | | |
|---|---|---|---|---|
| KR | 10-2019-0043315 | | 4/2019 | |
| KR | 10-2019-0045596 | | 5/2019 | |
| KR | 10-2019-0049508 | | 5/2019 | |
| WO | WO 2018/215046 | | 11/2018 | |
| WO | WO-2018215046 A1 * | | 11/2018 | ......... H04L 67/1021 |

OTHER PUBLICATIONS

European Search Report dated Sep. 19, 2022 issued in Application No. 20826053.9.

Chinese Office Action dated Sep. 20, 2023 issued in Application No. 202080028238.9.

International Search Report dated Sep. 11, 2020 issued in Application No. PCT/KR2020/007997.

Baktir, Ahmet Cihat et al. How Can Edge Computing Benefit from Software-Defined Networking: A Survey, Use Cased & Future Directions. IEEE Communications Surveys & Tutorials. vol. 19, Issue 4, Jun. 2017. See p. 16, right column line 3—p. 22, left column line 10 and figure 16.

5G 3GPP. OSIA S&TR Journal. vol. 29, No. 4, Dec. 2016, non-official translation (Kim, Hyeonsuk. 3GPP Technology Trends for 5G Networks.) See p. 5 and figures 1-2.

* cited by examiner

FIG. 6

| Edge Service Name | Edge node(gNB_Edge9) | | | | | |
|---|---|---|---|---|---|---|
| | Hosting address (5-tuple Flow) srcIP, dstIP, srcPort, dstPort, Protocol | Performance numerical value (Throughput, Latency) | Service I/F Name | I/F Load information | Transmission/ reception processing scheme | Max. Number of Sessions (K) / |
| Local CDN_1 | 172.15.x.x, ... | 10Gb, 3ms | N3, N6, gNB_Edge9 emp1s0, ID 0x131 | 47% | IP communication | 0.7 |
| Local Video_4 | 172.16.x.x, ... | 5Gb, 5ms | N3, gNB_Edge9 emp1s0, ID 0x131 | 52% | GTPU communication | 0.3 |
| LBS Service_1 | 172.43.x.x, ... | 1Gb, 5ms | N3, gNB_Edge9 emp1s0, ID 0x131 | 30% | VxLAN communication | 0.1 |
| Web Service_2 | 172.51.x.x, ... | 2Gb, 6ms | N3, gNB_Edge9 emp1s0, ID 0x131 | 5% | IP communication | 0.2 |
| Web Service_1 | 172.52.x.x, ... | 3Gb, 6ms | N3, gNB_Edge9 emp1s0, ID 0x131 | 4% | IP communication | 0.2 |
| Radio Service_3 | 172.100.10, ... | 10Gb, 1ms | N3, gNB_Edge9 emp1s0, ID 0x131 | 83% | GTPU communication | 0.8 |
| ... | ... | ... | ... | ... | ... | ... |

FIG. 7

State information in UPF

| Interface, Location, Port ID | Number of Edge Services Available | Number of Sessions (K) | Edge Service Name/List | Edge Service Capability | UPF Load Information |
|---|---|---|---|---|---|
| N3, gNB_Edge3, enp1s0 ID 0x131 | 4 | 4.2 | 1. Local CDN_1<br>2. Local Video_4<br>3. LBS Service_1<br>4. Web Service_2 | (1,2,3) | Bandwidth = 15Gb<br>Latency = 2ms |
| N3, gNB_Edge4, enp1s0 ID 0x42A | 3 | 3.1 | 1. Local CDN_3<br>2. Local Video_2<br>3. Web Service_2 | (2,3) | Bandwidth = 10Gb<br>Latency = 1ms |
| N3, gNB_Edge2, enp1s0 ID 0x42A | 2 | 3.5 | 1. Radio Service_1<br>2. Radio Service_2 | (1,2) | Bandwidth = 12Gb<br>Latency = 1ms |
| N3, gNB_Edge3, virbr0 ID 0x7AE | 1 | 0.4 | 1. Local AR/VR_2 | (1) | Bandwidth = 3Gb<br>Latency = 3ms |
| N6, UPF_Edge6, enp1s0 ID 0xbbbb | 2 | 2.7 | 1. Content_Filter_2<br>2. Professional Videostream_4 | (3) | Bandwidth = 40Gb<br>Latency = 4ms |
| N6, UPF_Edge1, enp1s0 ID 0xd681 | 1 | 2.1 | 1. Broadband VideoStream_1 | (4) | Bandwidth = 37Gb<br>Latency = 2.5ms |

NETWORK DEVICE AND METHOD FOR SEARCHING FOR EDGE SERVICE IMPLEMENTED IN NETWORK DEVICE

CROSS-REFERENCE TO RELATED PATENT APPLICATIONS

This application is a U.S. National Stage Application under 35 U.S.C. § 371 of PCT Application No. PCT/KR2020/007997, filed Jun. 19, 2020, which claims priority to Korean Patent Application No. 10-2019-0072947, filed Jun. 19, 2019, whose entire disclosures are hereby incorporated by reference.

BACKGROUND OF THE INVENTION

1. Field of the Invention

The present disclosure relates to a technology for searching for an edge service in connection with a user plane function (UPF).

The present disclosure claims priority to Korean Application No. 10-2019-0072947 filed on Jun. 19, 2019, the entire content of which is hereby incorporated by reference.

2. Description of the Prior Art

Diversification of the communication service type, required transmission rates, and the like in LTE communication systems has led to ongoing evolution to 5G communication systems.

5G communication systems support the scenario of enhanced mobile broadband (eMBB)/massive machine type communications (mMTC)/ultra-reliable and low-latency communications (URLLC) while accommodating as many terminals as possible on the basis of limited radio resources.

Particularly, 5G defines network structures for end-to-end support of terminals, base stations (access), cores, and servers.

Accordingly, 5G separates s the control signaling function and data transmission/reception function complexly performed by a single node (for example, S-GW or P-GW) in existing LTE (4G), and defines a network structure that distinguishes between the control plane of the control signaling function and the user plane of the data transmission/reception function.

The control node of the control plane according to 5G may be defined as an access and mobility function (AMF) for controlling access of a terminal in a radio section, a policy control function (PCF) for managing/controlling terminal information, terminal-specific subscription service information, and policies regarding accounting and the like, a session management function (SMF) for managing/controlling sessions for using data services for respective terminals, a network exposure function (NEF) for sharing information with an external network, a network repository function (NRF) for managing/controlling information regarding respective nodes in the network, or the like.

In addition, a data node of the user plane in 5G may define a user plane function (UPF) for transmitting/receiving data between a terminal and a server of an external service network (for example, the Internet) through a session with the terminal on the basis of control (interworking) of the SMF.

Meanwhile, in line with recent attention to edge computing technology, 5G is expected to evolve into a structure in which an edge service is provided by a node close to a client (UE) (hereinafter, referred to an edge node) for the purpose of a low-latency service.

However, current standards provide no specific scheme for enabling the edge node (which may be UPF) to determine what edge service is to be provided thereby, and for enabling the SMF to search for/select an edge service to be applied to the terminal (subscriber).

Accordingly, the present disclosure proposes a scheme for enabling the user plane function (UPF) to search for an edge service such that the SMF can search for/select an edge service to be applied to the terminal (subscriber).

SUMMARY OF THE INVENTION

An aspect of the present disclosure is to provide a specific technical scheme for enabling a user plane function (UPF) to search for an edge service.

A network device according to an embodiment of the present disclosure includes: a request reception unit configured to receive an edge service search request for a subscriber from a control node; an edge service search unit configured to, in response to the search request, search for an edge service which can be provided when data of the subscriber is processed, for each of interfaces of the network device; and a search result providing unit configured to return a result of searching for the edge service to the control node, so as to enable the control node to apply the edge service when a data session of the subscriber is controlled.

Specifically, the edge service search request and the returned result may be transmitted or received according to an interface between a data node and the control node, the interface being defined in a service-based interface between nodes (network functions (NF)).

Specifically, the edge service search unit may be configured to: perform signaling with each of edge nodes identified as being in a connection state, for each of the interfaces, so as to obtain service information relating to a specific edge service which satisfies a required performance when the data of the subscriber is processed; and search for the specific edge service for which the service information is obtained, as the edge service which can be provided when the data of the subscriber is processed.

Specifically, the search result providing unit may be configured to: manage state information between the network device and the edge service, based on the obtained service information of the specific edge service; and return the state information to the control node as an edge service search result for the subscriber.

Specifically, service information relating to an edge service may include at least one of an edge service name, a hosting address providing an edge service, a service performance, service interface (I/F) information, I/F load information, or a transmission/reception processing scheme.

Specifically, the state information between the network device and the edge service may include, for each of edge nodes in which the edge service is found, at least one of service interface (I/F) information indicating at least one of an ID, a communication port, a node location, or an interface (I/F) of an edge node, a number of edge services available in an edge node and an edge service list, or load information generated in the network device when the edge service is provided.

Specifically, the signaling performed with each of the edge nodes may include: a process of providing a traffic profile of the subscriber to each of the edge nodes so as to request to identify whether the edge service can be provided to the subscriber; a process in which each of the edge nodes identifies whether the specific edge service, which satisfies the required performance when the data of the subscriber is processed, exists among edge services supported by the edge node, based on the traffic profile of the subscriber; and a process in which, among each of the edge nodes, an edge node having identified that the specific edge service exists returns the service information relating to the specific edge service.

Specifically, the signaling performed with each of the edge nodes may include a process in which, among each of the edge nodes, an edge node having identified that the specific edge service does not exist performs signaling with another edge node identified as being connected to the edge node, so as to obtain the service information relating to the specific edge service which satisfies the required performance when the data of the subscriber is processed, and among each of the edge nodes, the edge node having identified that the specific edge service does not exist returns the obtained service information of the specific edge service to the network device.

Specifically, the edge service search unit may be configured to: identify an interface in an active state among interfaces of the network device; for each of interfaces identified as being in the active state, detect an address of at least one edge node connected through the interface; and for each of the interfaces, identify an edge node, the address of which has been detected, as an edge node in a connection state.

Specifically, the edge node may be located in an access node connected to the network device through an N3 interface, located in a data node connected to the network device through an N9 interface, or located in a separate node connected to the network device through an N6 interface.

An edge service search method performed by a network device according to an embodiment of the present disclosure includes: a request receiving operation of receiving an edge service search request for a subscriber from a control node; an edge service search operation of, in response to the search request, searching for an edge service which can be provided when data of the subscriber is processed, for each of interfaces of the network device; and a search result providing operation of returning a result of searching for the edge service to the control node so as to enable the control node to apply the edge service when a data session of the subscriber is controlled.

Specifically, the edge service search request and the returned result may be transmitted or received according to an interface between a data node and the control node, the interface being defined in a service-based interface between nodes (network functions (NF)).

Specifically, the edge service search operation may include: performing signaling with each of edge nodes identified as being in a connection state, for each of the interfaces, so as to obtain service information relating to a specific edge service which satisfies a required performance when the data of the subscriber is processed; and searching for the specific edge service for which the service information is obtained, as the edge service which can be provided when the data of the subscriber is processed.

Specifically, the search result providing operation may include: managing state information between the network device and the edge service, based on the obtained service information of the specific edge service; and returning the state information to the control node as an edge service search result for the subscriber.

Specifically, the signaling performed with each of the edge nodes may include: a process of providing a traffic profile of the subscriber to each of the edge nodes so as to request to identify whether the edge service can be provided to the subscriber; a process in which each of the edge nodes identifies whether the specific edge service, which satisfies the required performance when the data of the subscriber is processed, exists among edge services supported by the edge node, based on the traffic profile of the subscriber; and a process in which, among each of the edge nodes, an edge node having identified that the specific edge service exists returns the service information relating to the specific edge service.

Specifically, the edge service search operation may include: identifying an interface in an active state among interfaces of the network device; for each of interfaces identified as being in the active state, detecting an address of at least one edge node connected through the interface; and for each of the interfaces, identifying an edge node, the address of which has been detected, as the edge node in the connection state.

Embodiments of the present disclosure are advantageous in that a technology regarding a scheme for enabling a UPF to search for an edge service is implemented, thereby providing a service environment in which a control plane can search for and select an edge service applicable to a terminal (subscriber).

BRIEF DESCRIPTION OF DRAWINGS

FIG. 6 is an exemplary diagram describing service information managed by an edge node according to an embodiment of the present disclosure.

FIG. 7 is an exemplary diagram describing state information managed by a UPF according to an embodiment of the present disclosure.

DETAILED DESCRIPTION OF THE EXEMPLARY EMBODIMENTS

Hereinafter, embodiments of the present disclosure will be described with reference to the accompanying drawings.

The present disclosure relates to a technology for searching for an edge service by a user plane function (UPF).

A 5G communication system supports scenarios of enhanced mobile broadband (eMBB)/massive machine type communications (mMTC)/ultra-reliable and low latency communications (URLLC), while accepting the maximum number of terminals on the basis of limited radio resources.

In particular, in 5G, a network structure for supporting a terminal, a base station (access), a core, and a server in an end-to-end manner is defined.

Accordingly, 5G defines a network structure in which a control signaling function area (control plane) and a data transmission/reception function area (user plane) are divided by separating control signaling and data transmission/reception functions, which are complexly performed by a single node (e.g., S-GW, P-GW, etc.) in the existing LTE (4G).

Figure 1:
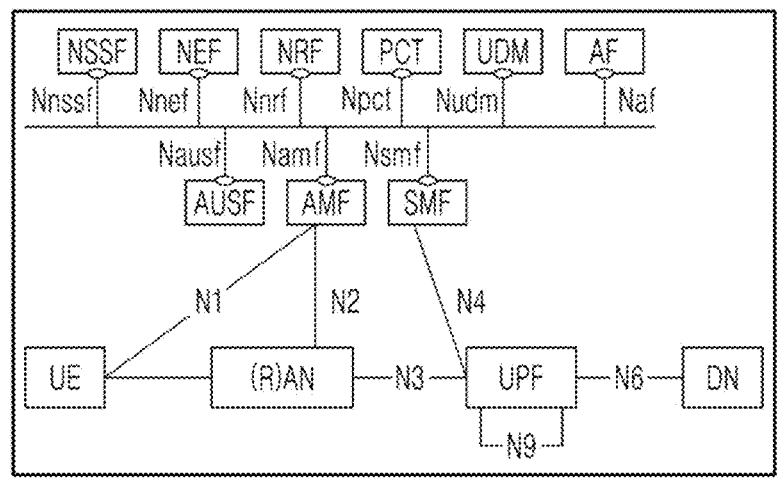
FIGS. 1 and 2 are exemplary diagrams showing a structure of a 5G system.
Figure 2:
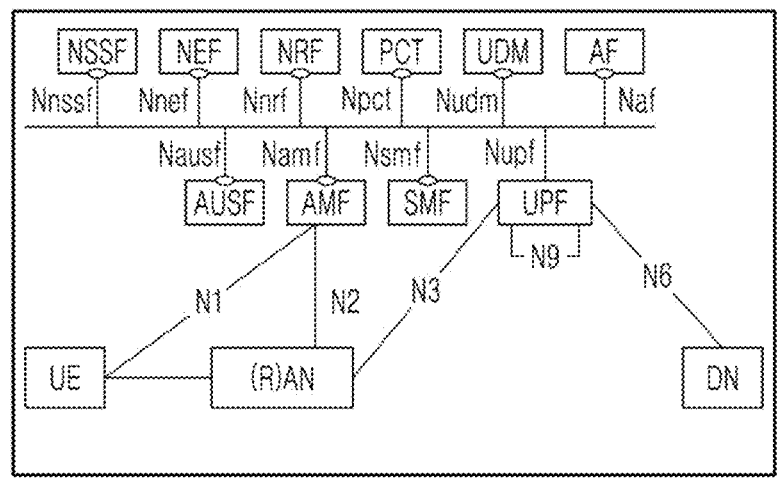

FIGS. 1 and 2 are exemplary diagrams showing a structure of a 5G system.

As can be seen in FIGS. 1 and 2, in 5G, a control node of a control plane may be defined as an access and mobility function (AMF) of controlling radio section access of a terminal, a policy control function (PCF) of managing/controlling policies such as terminal information, subscription service information for each terminal, and charging, a session management function (SMF) of managing/controlling a session for data service use for each terminal, a network exposure function (NEF) responsible for information sharing with an external network, a network repository function (NRF) of managing/controlling information on each node in a network, and the like.

In addition, in 5G, a data node of a user plane may be defined as a user plane function (UPF) of transmitting or receiving data between a terminal and a server on an external service network (e.g., data network (DN)) through a session with the terminal, based on the control (interworking) of an SMF.

As can be seen in FIG. 1, in the current 5G, for the interworking performance between (R)AN-cores (e.g., DNs) or interworking performance between UE-cores (e.g., DNs), an Nx interface (I/F) in a point-to-point scheme is adopted.

However, in 5G, as features of a service-based architecture (SBA) such as an all-active structure and full virtualization NF (VNF) are required in the future, a structure for evolving all control nodes of a control plane into an SBA has been discussed.

Accordingly, as shown in FIG. 2, an I/F between an SMF and a UPF is also expected to evolve from an N4 I/F into an SBI I/F (Nupf).

Further, in a case in which an interface of the UPF evolves from the N4 I/F into the SBI I/F (Nupf), the UPF can directly communicate with each control node (an NF of a control plane) in a control plane, based on Nupf, without going through the SMF.

On the other hand, as an edge computing technology has recently become a topic of discussion, in 5G, it is expected to evolve into a structure that provides an edge service in a node close to a customer (UE) (hereafter, an edge node) for a low-latency service.

However, in the current standard, from the point of view of an edge node (which may be a UPF), it is impossible to determine an edge service to provide, and there is no specific solution in which an SMF, which actually manages/controls a data session of a terminal, can search for/select an edge service to be applied to the terminal (subscriber).

Accordingly, the present disclosure proposes a method for searching for an edge service by a user plane function (UPF), and thus provides a service environment in which a control plane (e.g., SMF, PCF, etc.) can search for/select an edge service to be applied to a terminal (subscriber).

Specifically, a network device for realizing a technical solution (hereinafter, an edge service search technology) proposed in the present disclosure is proposed.

The edge service search technology proposed in the present disclosure has a feature of realizing a service environment in which, through a request and a response between a control node and a data node, the control node recognizes an edge service applicable when controlling a data session of a subscriber, so that a control plane (control node) can search for/select an edge service to be applied to a subscriber.

In the current standard, an SMF which actually manages/controls a data session of a terminal is not aware of a subscriber's data traffic path (hereinafter, a user plane path) for an edge service, and an edge service state.

Accordingly, the present disclosure is directed to realizing a configuration in which a control node such as an SMF requests an edge service search for a subscriber from a UPF and receives a search result as a response, so that a control plane (control node) recognizes an edge service applicable when a data session of the subscriber is controlled.

In addition, the edge service search technology proposed in the present disclosure has a feature in which, in response to a request from a control node, a data node searches for an edge service which can be provided when data of a subscriber is processed, so that an edge service search is realized in a data plane (data node).

Figure 3:
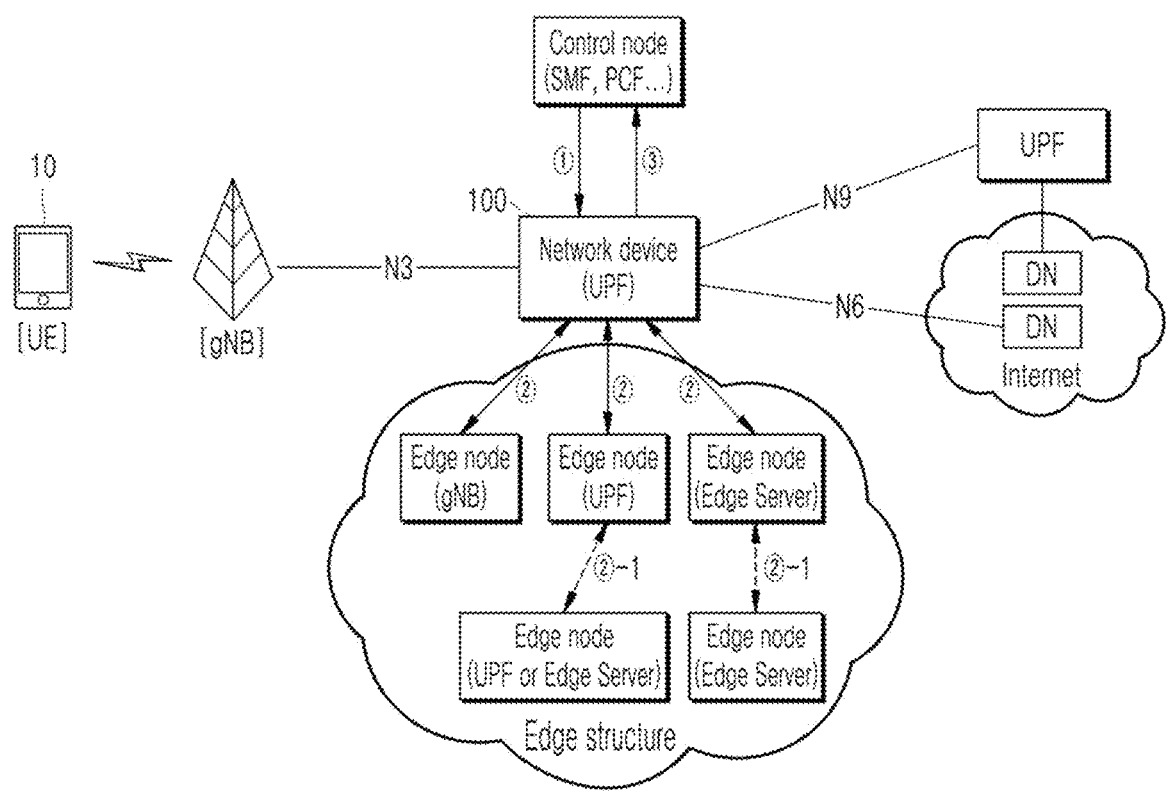
FIG. 3 is an exemplary diagram showing an edge service search scenario according to an embodiment of the present disclosure.

FIG. 3 is an exemplary diagram showing an edge service search scenario according to an embodiment of the present disclosure.

As can be seen in FIG. 3, a subject realizing the edge service search technology proposed in the present disclosure, that is, a network device 100, may be a UPF as a data node.

In addition, a control node which requests an edge service search for a subscriber from the network device 100 of the present disclosure, that is, the UPF 100, may be a node among NFs of a control plane such as an SMF and a PCF of the control plane. However, the node will be referred to as an SMF for convenience of description hereinafter.

According to the edge service search technology proposed in the present disclosure, a control node, for example, an SMF, may request an edge service search for a subscriber from the network device 100.

As can be seen in FIG. 3, the network device 100 may be the UPF 100 which transmits/receives data by participating in a data session of a subscriber (e.g., a UE 10), that is, processes a data session.

Accordingly, in a case where there are multiple UPFs 100 which process a data session of a subscriber (UE), the SMF may request an edge service search from each of the multiple UPFs 100.

However, for convenience of description, FIG. 3 illustrates one UPF 100 which processes a data session of a subscriber (UE).

In addition, an edge service search request received by the network device 100 may be for one subscriber or for multiple subscribers. However, hereinafter, for convenience of description, one subscriber, for example, a UE 10 is referred to and described.

A control plane basically has a subscriber's profile, and in the present disclosure, a control node (PCF, SMF, NRF, NEF, NSSF, UDM, etc.) of the control plane may trigger the occurrence of a predefined event, based on a subscriber profile, so as to request, from a UPF, an edge service search for a subscriber in which an event has occurred.

The subscriber profile may include UE identification information such as terminal addresses (IMSI, MSISDN, SUPI, GPSI, and IP) for identifying a subscriber, N/W slice ID identification for a subscriber, subscriber service/product-based identification which matches identification of a subscriber, an edge service name desired by a subscriber, an edge IP address, service QoS information, and the like.

In addition, an event triggering an edge service search request may be defined as occurring when a subscriber enters/exits a specific area, when a subscriber performs handover, or when a specific control event occurs.

In addition, the edge service search request may be triggered based on a wireless idle/active state of a subscriber terminal, the type and state of a connected RAT, a wireless quality (available resource block, RSSI, RSRP, and RSRQ information) state of the terminal, and carrier aggregation and 5G-LTE PDCP aggregation information.

Accordingly, according to an embodiment of the present disclosure, a control node, for example, an SMF may monitor whether a predefined event occurs, based on a subscriber profile and, when an event occurs, request, from the UPF 100, an edge service search for a subscriber (UE 10) in which the event has occurred (①).

According to the edge service search technology proposed in the present disclosure, the UPF 100, which has received an edge service search request from the control node, for example, the SMF, searches for an edge service which can be provided when data of a subscriber (UE 10) is processed, for each of interfaces of the UPF 100, in response to the edge service search request.

Specifically, the UPF 100 may perform signaling with each of edge nodes identified as being in a connection state, for each of interfaces N3, N6, and N9 of the UPF 100, so as to obtain service information relating to a specific edge service which satisfies a required performance when the data of the subscriber (UE 10) is processed, and search for the specific edge service for which the service information is obtained, as an edge service which can be provided when the data of the subscriber (UE 10) is processed.

As can be seen in FIG. 3, according to an embodiment of the present disclosure, the signaling performed by the UPF 100 to search for an edge service may include, in addition to direct signaling (②) that the UPF 100 performs with an edge node directly connected thereto, indirect signaling (②-1) that the UPF performs with another edge node connected to the edge node.

The signaling performed by the UPF 100 to search for an edge service will be described in detail again below.

As shown in FIG. 3, an edge node providing an edge service may be located in an access node (gNB or (R)AN) connected to the UPF 100 through an N3 interface, may be located in a data node, that is, a UPF, that is connected to the UPF 100 through an N9 interface, or may be located in a separate node (hereinafter, an edge server) connected to the UPF 100 through an N6 interface. That is, the edge node may be located in an N3, N6, or N9 section.

An edge service provided by such an edge node may be implemented in various ways, such as a contents delivery network (CDN) service, an inline caching/proxy function, a video streaming function, a web content service, a vehicle communication service, a map service, a location service, a radio information extraction service, a graphic rendering service, and a big data analysis and extraction function.

Further, an edge service provided by the edge node located/implemented in the UPF may be implemented in various ways, in consideration of a data plane, such as a data packet compression/decompression function of traffic, a network address translation (NAT) service, a traffic packet storage/loading function, a streaming adjustment/pacing function according to a video quality/BW state, a protocol/packet compression service function, a traffic duplicate transmission/de-duplication function for safe transmission and reception, and a function of changing L2 (MAC), L3 (IP), L4 (port) and L7 (content) addresses of a subscriber or an edge server.

The difference between an edge node in the present disclosure and a device (server) providing the same service on the general Internet network is that the edge node is a system in a subscription network to which a subscriber subscribes and the device (server) providing the same service on the Internet network is a system outside (external to) the subscription network.

Therefore, compared to an external device (server), the edge node in the present disclosure is characterized in that, even when the same service is provided, the number of node hops for service provision is small, latency is small, and a service end point is located after a base station (gNB).

According to the edge service search technology proposed in the present disclosure, the UPF 100 searches for an edge service which can be provided when data of a subscriber (UE 10) is processed, through direct signaling (②) and indirect signaling (②-1) as described above, and then returns an edge service search result to the control node, for example, the SMF (③).

In this case, the edge service search request (①) and the returned edge service search result (③) may be transmitted or received according to an interface between a control node and a data node, that is, a network device 100 as a UPF, the interface being defined in a service-based interface between nodes (network function (NF)), that is, an Nupf interface (request/response and subscribe/notify).

As described above, according to an embodiment of the present disclosure, a service environment may be realized in which, based on a request and a response according to the Nupf interface between the control node and the data node, the data node (UPF) can realize an edge service search in response to a request from the control node (e.g., SMF) and the control node (e.g., SMF) can search for/select an edge service to be applied to a subscriber.

Hereinafter, the configuration of the network device for realizing the edge service search technology of the present disclosure is described in detail with reference to FIG. 4.

Figure 4:
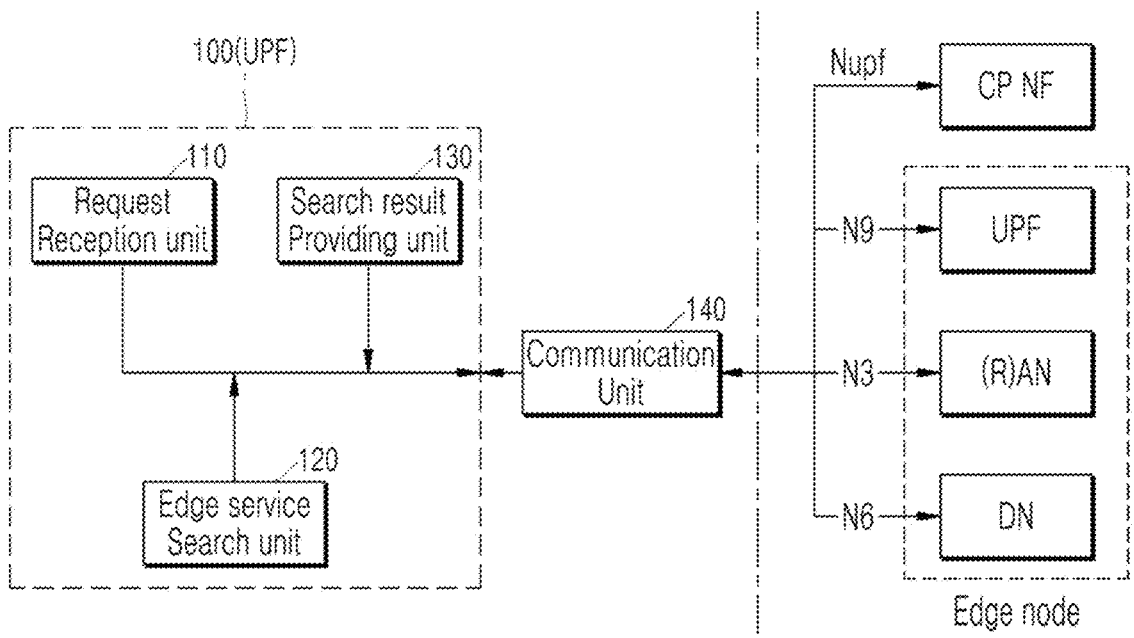
FIG. 4 is a block diagram showing a configuration of a network device according to an embodiment of the present disclosure.

As shown in FIG. 4, the network device 100 according to an embodiment of the present disclosure includes a request reception unit 110, an edge service search unit 120, and a search result providing unit 130.

The network device 100 of the present disclosure may correspond to a data node of a user plane shown in FIGS. 1 and 2, that is, each UPF.

Further, the network device 100 according to an embodiment of the present disclosure may further include a communication unit 140 configured to communicate with a terminal-side (R)AN, an external service network (e.g., data network (DN)) and/or another UPF in order to connect a data session between an NF of a control plane, that is, a control node, a terminal, and the external service network (e.g., data network (DN)).

Accordingly, the communication unit 140 may support an N9 interface defined to communicate with another UPF, support an N3 interface defined to communicate with (R)AN, and support an N6 interface defined to communicate with a DN, and further support an Nupf interface (request/response and subscribe/notify) defined to communicate with the NF of the control plane, that is, the control node (e.g., SMF, PCF, etc.).

All or at least some of the elements of the network device 100 may be implemented in the form of a hardware module or a software module, or may be implemented in a form in which a hardware module and a software module are combined.

The software module may be understood as, for example, an instruction executed by a processor which controls an operation in the network device 100, and the instruction may be mounted in a memory in the network device 100.

Ultimately, the network device 100 according to an embodiment of the present disclosure realizes a method proposed in the present disclosure, that is, a method for searching for an edge service by a UPF, through the above-described configuration, and hereinafter, each configuration in the network device 100 for realizing the above method is described in more detail.

The request reception unit 110 is configured to receive an edge service search request for a subscriber (e.g., UE 10) from a control node.

Specifically, the request reception unit 110 may receive an edge service search request in an Nupf interface-based request or subscribe form from a control node, for example, an SMF.

The edge service search unit 120 is in charge of searching for an edge service which can be provided when data of a subscriber is processed, for each of interfaces of the network device 100, in response to an edge service search request received through the request reception unit 110.

The network device 100 of the present disclosure corresponds to a data node of a data transmission/reception area (user plane), that is, a UPF.

Accordingly, the edge service search unit 120 in the network device 100 (UPF) of the present disclosure may search for an edge service which can be provided when data of a subscriber (e.g., UE 10) is processed, for each of interfaces N3, N6, and N9 of the UPF 100.

More specifically, the edge service search unit 120 performs signaling with each of edge nodes identified as being in a connection state, for each of the interfaces N3, N6, and N9, and thus obtains service information relating to a specific edge service which satisfies a required performance when the data of the subscriber (UE 10) is processed.

Accordingly, the edge service search unit 120 may search for the specific edge service for which the service information is obtained as described above, as an edge service which can be provided when the data of the subscriber (UE 10) is processed.

The search result providing unit 130 returns an edge service search result of the edge service search unit 120 to the control node, for example, the SMF, and enables the control node, for example, the SMF to apply an edge service when a data session of the subscriber (UE 10) is controlled.

Specifically, the search result providing unit 130 may return an edge service search result in an Nupf interface-based response or notify form to the control node, for example, the SMF.

Hereinafter, a process of searching for an edge service by the network device 100 (UPF) of the present disclosure (or signaling performed to search for an edge service) is described in detail.

As described above, the edge service search unit 120 performs signaling with each of edge nodes identified as being in a connection state, for each of the interfaces N3, N6, and N9, in order to search for an edge service which satisfies a required performance when the data of the subscriber (UE 10) is processed.

Specifically, the edge service search unit 120 may first perform a connection state-based edge node search for each of the interfaces N3, N6, and N9.

In the present disclosure, the network device 100 (UPF) may perform connection state management with respect to a session for an edge service.

The connection state management means checking a bandwidth, latency, and QoS of a session in real time for each of the interfaces N3, N6, and N9 of the UPF, and guaranteeing the same at a certain level.

Accordingly, the edge service search unit 120 may perform an active I/F search process in the UPF to identify an interface in an active state among the interfaces N3, N6, and N9 of the network device 100 (UPF).

For example, the edge service search unit 120 may identify whether each of the interfaces is in an active state through whether a bandwidth, latency, and session QoS for each of the interfaces N3, N6, and N9 are greater than or equal to a predetermined level, based on an active measurement technique of performing measurement by directly transmitting or receiving traffic by using various L2-L7 protocols, such as a ping scheme based on an Internet control message protocol (ICMP), a neighbor discovery protocol (NDP) router search scheme, HTTP keep alive/heartbeat, and SBI-based HTTP service discovery.

Alternatively, based on a passive measurement technique of performing measurement through probing (for example, traffic mirroring) for traffic which is transmitted or received, the edge service search unit 120 may identify whether each of the interfaces is in an active state through whether a bandwidth, latency, and session QoS for each of the interfaces N3, N6, and N9 are greater than or equal to a predetermined level.

In addition, the edge service search unit 120 may perform an edge node address detection process of, for each of the interfaces identified as being in an active state, detecting an address of at least one edge node connected through the interface.

For example, the edge service search unit 120 may detect an address of an edge node which provides an edge service, by identifying a service function (if an edge node is implemented, an edge service is to be included) through capability of an access node (gNB or (R)AN)/UPF connected to the N3/N9 interfaces identified as being in an active state.

Alternatively, the edge service search unit 120 may detect an address of an edge node which provides an edge service, by identifying a service function through a service list/ID of an edge server connected to the N6 interface identified as being in an active state.

Accordingly, the edge service search unit 120 may identify, as an edge node in a connection state, an edge node of which an address is detected, for each of the interfaces N3, N6, and N9.

When each of edge nodes is searched for/identified for each of the interfaces N3, N6, and N9 through the connection state-based edge node search as described above, the edge service search unit 120 performs signaling with each of the edge nodes to search for an edge service which satisfies a required performance when data of a subscriber (UE 10) is processed.

The signaling performed with each of the edge nodes includes a process of providing a traffic profile of a subscriber (UE 10) to each of the edge nodes so as to request to identify whether an edge service can be provided to the subscriber (UE 10), a process in which each of the edge nodes identifies whether a specific edge service, which satisfies a required performance when data of the subscriber (UE 10) is processed, exists among edge services supported by the edge node, based on the traffic profile of the subscriber (UE 10), and a process in which, among each of the edge nodes, an edge node having identified that the specific edge service exists returns service information relating to the specific edge service.

In a specific embodiment, if each of edge nodes is searched for/identified for each of the interfaces N3, N6, and N9 through the connection state-based edge node search as described above, the edge service search unit 120 may provide a traffic profile of a subscriber (UE 10) to each of the edge nodes so as to request to identify whether an edge service can be provided to the subscriber (UE 10).

In this case, the traffic profile of the subscriber (UE 10) may include UE identification information such as UE addresses (IMSI, MSISDN, SUPI, GPSI, and IP) for identifying a subscriber, a UE session, a required performance (bandwidth, latency, etc.) of a UE, a UE service name, and the like.

Accordingly, according to the present disclosure, when receiving, from the UPF 100, a request to identify whether an edge service can be provided to a subscriber (UE 10), an edge node may identify whether a specific edge service, which satisfies a required performance (bandwidth, latency, etc.) when data of the subscriber (UE 10) is processed, exists among edge services supported by the edge node, based on the provided traffic profile of the subscriber (UE 10).

Accordingly, among each of edge nodes which receive, from the UPF 100, a request to identify whether an edge service can be provided to the subscriber (UE 10), an edge node having identified that the specific edge service, which satisfies the required performance (bandwidth, latency, etc.) when the data of the subscriber (UE 10) is processed, exists returns service information relating to the specific edge service to the UPF 100.

Furthermore, the signaling performed with each of edge nodes may further include a process in which, among each of edge nodes which receive, from the UPF 100, a request to identify whether an edge service can be provided to the subscriber (UE 10), an edge node having identified that there is no specific edge service performs signaling with another edge node identified as being connected to the edge node, so as to obtain service information relating to a specific edge service which satisfies a required performance when data of the subscriber (UE 10) is processed, and a process of relaying and returning the service information of the specific edge service obtained as described above to the UPF 100.

For example, among each of edge nodes which receive, from the UPF 100, a request to identify whether an edge service can be provided to the subscriber (UE 10), an edge node having identified that there is no specific edge service which satisfies a required performance (bandwidth, latency, etc.) when data of the subscriber (UE 10) is processed performs the same connection state-based edge node search performed by the edge service search unit 120 as described above, and relays a traffic profile of the subscriber (UE 10) to another edge node identified as being connected to the edge node, so as to request to identify whether an edge service can be provided to the subscriber (UE 10).

In this case, another edge node having received the relayed traffic profile of the subscriber (UE 10) from the edge node may identify whether a specific edge service, which satisfies the required performance (bandwidth, latency, etc.) when the data of the subscriber (UE 10) is processed, exists among edge services supported by the edge node, based on the relayed traffic profile of the subscriber (UE 10), and if the specific edge service exists, return service information relating to the specific edge service to the edge node such that the service information is relayed/returned to the UPF 100, or if the specific edge service does not exist, relay the traffic profile of the subscriber (UE 10) to still another edge node after performing the same connection state-based edge node search as described above.

In the present disclosure, an embodiment may be possible in which an edge node having identified that a specific edge service, which satisfies a required performance (bandwidth, latency, etc.) when data of a subscriber (UE 10) is processed, exists performs signaling with another edge node identified as being connected to the edge node, separately from returning service information relating to the specific edge service to a UPF 100, so as to obtain service information relating to the specific edge service which satisfies the required performance when the data of the subscriber (UE 10) is processed, and relay/return the service information to the UPF 100.

In this case, service information relating to an edge service may include at least one of an edge service name, a hosting address providing an edge service, a service performance, service interface (I/F) information, I/F load information, or a transmission/reception processing scheme.

More specifically, as shown in FIG. 6, in the present disclosure, each of edge nodes possesses service information relating to an edge service supported by the edge node.

Figure 5:
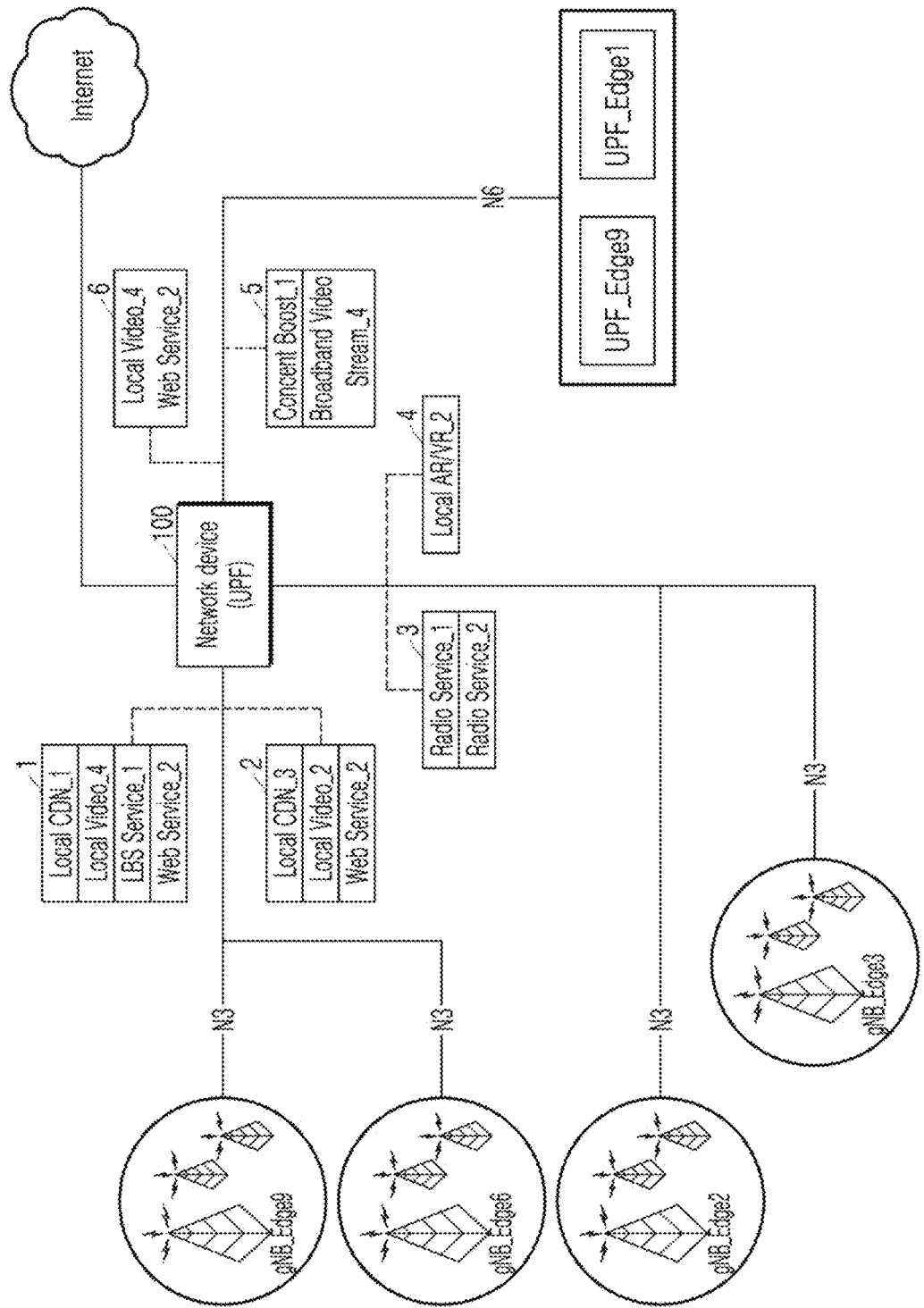
FIG. 5 is an exemplary diagram showing an edge service search result found by a network device according to an embodiment of the present disclosure.

FIG. 6 illustrates the assumption of service information possessed by gNB_Edge9 among the edge nodes shown in FIG. 5.

As can be seen in FIG. 6, service information relating to an edge service may indicate information such as an edge service name, a hosting address providing an edge service, a service performance (performance numerical value), service interface (I/F) information (service I/F name), I/F load information, and a transmission/reception processing scheme.

For example, local CDN, which is one of edge services supported by gNB_Edge9, refers to a service for caching a content locally.

The service information relating to a local CDN service includes a hosting address (IP flow) where gNB_Edge9 provides a local CDN service, a performance numerical value providing the same, a service I/F name for providing a service, I/F load information, and a transmission/reception processing scheme.

The transmission/reception processing scheme refers to the type of data transmitted when data is transmitted to or received from a UPF. For example, in IP communication (5-tuple flow), in a GPTU scheme, a PDU session (encapsulation with GPTU) is relayed, and in VxLAN communication, traffic is encapsulated with VxLAN and transmitted.

As shown in FIG. 5, it is assumed that the network device 100 of the present disclosure, that is, the UPF 100, performs a connection state-based edge node search, so as to search for/identify gNB_Edge9, gNB_Edge6, gNB_Edge2, gNB_Edge3, UPF_Edge9, and UPF_Edge1 for each of interfaces N3, N6, and N9, and the network device provides a traffic profile of a subscriber (UE 10) to each of edge nodes (gNB_Edge9, gNB_Edge6, gNB_Edge2, gNB_Edge3, UPF_Edge9, and UPF_Edge1) so as to request to identify whether an edge service can be provided to the subscriber (UE 10).

Further, in FIG. 5, for convenience of description, it is assumed that a specific edge service, which satisfies a required performance (bandwidth, latency, etc.) when data of a subscriber (UE 10) is processed, exists in all edge nodes (gNB_Edge9, gNB_Edge6, gNB_Edge2, gNB_Edge3, UPF_Edge9, and UPF_Edge1).

In this case, among each of edge nodes which receive, from the UPF 100, a request to identify whether an edge service can be provided to the subscriber (UE 10), an edge node having identified that the specific edge service, which satisfies the required performance (bandwidth, latency, etc.)

when the data of the subscriber (UE 10) is processed, exists returns service information relating to the specific edge service to the UPF 100.

In FIG. 5, gNB_Edge9 returns service information 1 relating to a specific edge service, gNB_Edge6 returns service information 2 relating to a specific edge service, gNB_Edge2 returns service information 3 relating to a specific edge service, gNB_Edge3 returns service information 4 for a specific edge service, UPF_Edge9 returns service information 5 relating to a specific edge service, and UPF_Edge1 returns service information 6 relating to a specific edge service.

Accordingly, the edge service search unit 120 may obtain service information 1, 2, 3, 4, 5, and 6 relating to a specific edge service by performing signaling with each of edge nodes for each of interfaces N3, N6, and N9, and search for a specific edge service for which service information is obtained as described above, as an edge service which can be provided when data of a subscriber (UE 10) is processed.

The search result providing unit 130 returns an edge service search result of the edge service search unit 120 to a control node, for example, an SMF.

More specifically, the search result providing unit 130 may manage state information between a network device 100 (UPF) and an edge service, based on service information of a specific edge service obtained by the edge service search unit 120.

The state information (state information in the UPF) between the network device 100 (UPF) and the edge service may include, for each of edge nodes in which the edge service is found, at least one of service interface (I/F) information indicating at least one of an ID, a communication port, a node location, or an interface (I/F) of an edge node, the number of edge services available in an edge node and an edge service list, or load information generated in the network device 100 (UPF) when the edge service is provided.

For example, the search result providing unit 130 may generate and manage, in table form, state information (hereinafter, state information in the UPF) between a network device 100 (UPF) and an edge service as shown in FIG. 7, based on service information of a specific edge service obtained by the edge service search unit 120.

The state information in the UPF shown in FIG. 7 is an example of generation/management based on the service information 1, 2, 3, 4, 5, and 6 of the specific edge service obtained in the embodiment assumed in FIG. 5 described above.

In the state information in the UPF, referring to the edge node gNB_Edge9 where an edge service is found, with respect to the edge node gNB_Edge9, service interface (I/F) information indicating an ID, a communication port, a node location, and an interface (I/F) of gNB_Edge9 may correspond to a service I/F name in the service information, and in addition, indicate the number of specific edge services available in the edge node gNB_Edge9 (number of edge service available), an edge service list (edge service name/list), load information (UPF load information: bandwidth and latency) generated in the network device 100 (UPF) when an edge service is provided, and the like.

Further, the search result providing unit 130, as an edge service search result for a subscriber (UE 10), returns the state information in the UPF managed in relation to the subscriber (UE 10) as described above to a control node, for example, an SMF, so as to enable the control node, for example, the SMF to identify edge services applicable when a session of the subscriber (UE 10) is controlled, that is, identify a data traffic path (hereinafter, a user plane path) for an edge service.

Furthermore, the search result providing unit 130 may store/manage the state information in the UPF managed in relation to the subscriber (UE 10) according to predefined storage and validity policies.

Accordingly, when receiving, from a control node (e.g., SMF), an edge service search request for the same subscriber (e.g., UE 10) or a subscriber who can be treated the same as the subscriber (e.g., UE 10), if the state information in the UPF available in relation to the subscriber (UE 10) is retained, the network device 100 (UPF) of the present disclosure may return, as an edge service search result, the retained state information in the UPF to the control node (e.g., SMF) without going through the above-mentioned edge node search and edge service search.

Alternatively, when receiving, from a control node (e.g., SMF), an edge service search request for the same subscriber (e.g., UE 10) or a subscriber who can be treated the same as the subscriber (e.g., UE 10), if the state information in the UPF available in relation to the subscriber (UE 10) is retained, the network device 100 (UPF) of the present disclosure may search for the latest edge service (service information) through the above-mentioned edge node search and edge service search to update the existing retained state information in the UPF, and then return the updated state information in the UPF to the control node (e.g., SMF) as an edge service search result.

According to an embodiment of the present disclosure, a service environment is realized in which, based on a request and a response according to an Nupf interface, a UPF searches for an edge service which can be provided when data of a subscriber is processed, in response to a request from a control plane (control node), so that the control plane (control node) can search for an edge service applicable when a session of the subscriber is controlled.

In particular, according to an embodiment of the present disclosure, a service environment is realized in which a control plane (control node), for example, an SMF, can identify, as an edge service search result for a subscriber, not only the types of applicable edge services but also a state (e.g., load information: bandwidth and latency) of each edge service, and thus can select a suitable (or optimal) edge service when a session of a subscriber is controlled.

As described above, according to an embodiment of the present disclosure, a solution (technology) for searching for an edge service by a data node (e.g., UPF) is realized, so that an effect of being capable of providing (realizing) a service environment in which a control plane (control node) can search for and select an edge service applicable to a subscriber is derived.

Figure 8:
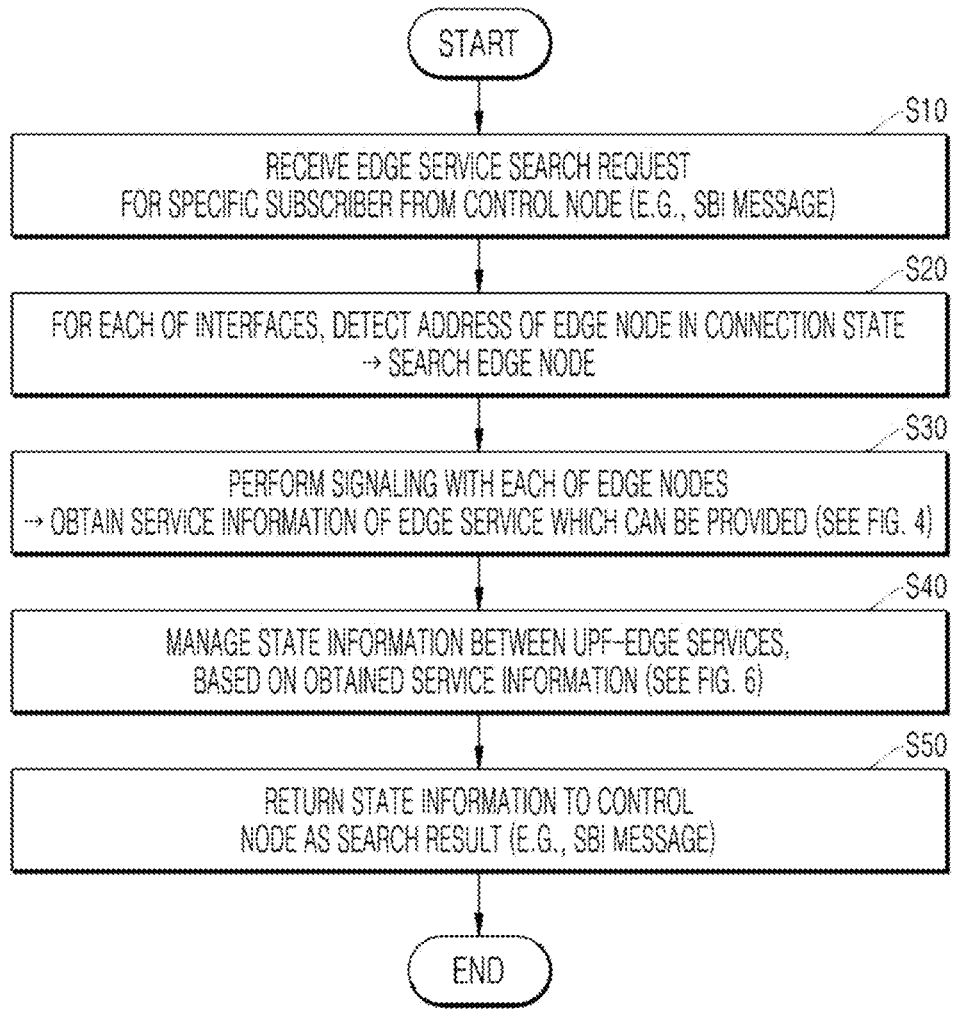
FIG. 8 is a flowchart showing an operation flow of an edge service search method according to an embodiment of the present disclosure.

Hereinafter, an edge service search method according to an embodiment of the present disclosure is described with reference to FIG. 8.

For convenience of description, the description is made by referring to a UPF 100 as a network device by which the edge service search method of the present disclosure is performed.

According to the edge service search method of the present disclosure, the UPF 100 may receive an edge service search request for a subscriber (e.g., UE 10) from a control node (S10).

Specifically, the UPF 100 may receive an edge service search request in the form of an SBI-based message (e.g., request or subscribe message) from the control node (e.g., SMF, PCF, etc.).

According to the edge service search method of the present disclosure, when the edge service search request is received (S10), the UPF 100 searches for an edge service which can be provided when data of the subscriber (e.g., UE 10) is processed, for each of interfaces of the UPF 100, in response to the received edge service search request (S20-S30).

According to the detailed description of an edge service search process, first, the UPF 100 may perform a connection state-based edge node search for each of interfaces N3, N6, and N9 of the UPF 100 (S20).

The UPF 100 may perform an active I/F search process in the UPF to identify an interface in an active state among the interfaces N3, N6, and N9 of the UPF 100.

For example, the UPF 100 may identify whether each of the interfaces is in an active state through whether a bandwidth, latency, and session QoS for each of the interfaces N3, N6, and N9 are greater than or equal to a predetermined level, based on an active measurement technique of performing measurement by directly transmitting or receiving traffic by using various L2-L7 protocols, such as a ping scheme based on an Internet control message protocol (ICMP), a neighbor discovery protocol (NDP) router search scheme, HTTP keep alive/heartbeat, and SBI-based HTTP service discovery.

Alternatively, based on a passive measurement technique of performing measurement through probing (for example, traffic mirroring) for traffic which is transmitted or received, the UPF 100 may identify whether each of the interfaces is in an active state through whether a bandwidth, latency, and session QoS for each of the interfaces N3, N6, and N9 are greater than or equal to a predetermined level.

In addition, the UPF 100 may perform an edge node address detection process of, for each of the interfaces identified as being in an active state, detecting an address of at least one edge node connected through the interface.

For example, the UPF 100 may detect an address of an edge node which provides an edge service, by identifying a service function (if an edge node is implemented, an edge service is to be included) through capability of an access node (gNB or (R)AN)/UPF connected to the N3/N9 interfaces identified as being in an active state.

Alternatively, the UPF 100 may detect an address of an edge node which provides an edge service, by identifying a service function through a service list/ID of an edge server connected to the N6 interface identified as being in an active state.

The address of the edge node may include an L2 (MAC)/L3 (IP) address, an ID of an edge node, a related edge node group ID in a case where there is more than one edge node, and an edge node local address.

Accordingly, the UPF 100 may identify, as an edge node in a connection state, an edge node of which an address is detected, for each of the interfaces N3, N6, and N9 (S20).

When each of edge nodes is searched for/identified for each of the interfaces N3, N6, and N9 through a connection state-based edge node search (S20), the UPF 100 performs signaling with each of the edge nodes to search for an edge service which satisfies a required performance when the data of the subscriber (UE 10) is processed (S30).

For example, if each of edge nodes is searched for/identified for each of the interfaces N3, N6, and N9 through the connection state-based edge node search as described above (S20), the UPF 100 may provide a traffic profile of the subscriber (UE 10) to each of the edge nodes, so as to request to identify whether an edge service can be provided to the subscriber (UE 10).

Accordingly, according to the present disclosure, when receiving, from the UPF 100, a request to identify whether an edge service can be provided to the subscriber (UE 10), an edge node may identify whether a specific edge service, which satisfies a required performance (bandwidth, latency, etc.) when the data of the subscriber (UE 10) is processed, exists among edge services supported by the edge node, based on the provided traffic profile of the subscriber (UE 10).

Accordingly, among each of edge nodes which receive, from the UPF 100, a request to identify whether an edge service can be provided to the subscriber (UE 10), an edge node having identified that the specific edge service, which satisfies the required performance (bandwidth, latency, etc.) when the data of the subscriber (UE 10) is processed, exists returns service information relating to the specific edge service to the UPF 100.

In this case, service information relating to an edge service may include at least one of an edge service name, a hosting address providing an edge service, a service performance, service interface (I/F) information, I/F load information, or a transmission/reception processing scheme.

Accordingly, the UPF 100 may obtain service information (e.g., information 1, 2, 3, 4, 5, and 6 of FIG. 5) relating to a specific edge service by performing signaling with each of edge nodes for each of the interfaces N3, N6, and N9, and search for the specific edge service for which the service information is obtained as described above, as an edge service which can be provided when the data of the subscriber (UE 10) is processed.

Further, according to the edge service search method of the present disclosure, based on the service information of the specific edge service obtained in operation S30, the UPF 100 may generate and manage, in table form, state information between the UPF 100 and the edge service (hereinafter, state information in the UPF) as shown in FIG. 7 (S40).

The state information in the UPF shown in FIG. 7 is an example of generation/management based on the service information 1, 2, 3, 4, 5, and 6 of the specific edge service obtained in the embodiment assumed in FIG. 5 described above.

Further, according to the edge service search method of the present disclosure, as an edge service search result for the subscriber (UE 10), the UPF 100 returns the state information in the UPF managed in relation to the subscriber (UE 10) as described above to the control node (e.g., SMF, PCF, etc.) (S50), so as to enable the control node (e.g., SMF, PCF, etc.) to recognize edge services applicable when a session of the subscriber (UE 10) is controlled.

Specifically, the UPF 100 may return an edge service search result in the form of an SBI-based message (e.g., response or notify message) to the control node (e.g., SMF, PCF, etc.).

According to an embodiment of the present disclosure, a service environment may be realized in which, based on a request and a response according to an Nupf interface, a UPF searches for an edge service which can be provided when data of a subscriber is processed, in response to a request from a control plane (control node), so that the control plane (control node) can search for an edge service applicable when a session of the subscriber is controlled.

In particular, according to an embodiment of the present disclosure, a service environment may be realized in which a control plane (control node) can identify, as an edge service search result for a subscriber, not only the types of applicable edge services but also a state (e.g., load information: bandwidth and latency) of each edge service, and thus can select a suitable (or optimal) edge service when a session of a subscriber is controlled.

As described above, according to an embodiment of the present disclosure, a solution (technology) for searching for an edge service by a data node (e.g., UPF) is realized, so that an effect of being capable of providing (realizing) a service environment in which a control plane (control node) can search for and select an edge service applicable to a subscriber is derived.

The edge service search method according to an embodiment of the present disclosure may be implemented in the form of a program command which can be executed through various computer means and recorded in a computer-readable medium. The computer-readable medium may include program commands, data files, data structures, etc. alone or in combination. The program command recorded on the medium may be specially designed and configured for the present disclosure, or may be known and available to those skilled in the art of computer software. Examples of a computer-readable recording medium include magnetic media such as a hard disk, a floppy disk, and a magnetic tape, optical recording media such as a CD-ROM and a DVD, magneto-optical media such as a floptical disk, and a hardware device specially configured to store and execute a program command, such as a ROM, a RAM, or a flash memory. Examples of the program command include not only a machine language code as generated by a compiler, but also a high-level language code that can be executed by a computer by using an interpreter or the like. The hardware device described above may be configured to operate as one or more software modules in order to perform the operations of the present disclosure, and vice versa.

Although the present disclosure is described in detail by referring to various embodiments, the present disclosure is not limited to the above-described embodiments, and it is to be understood that the technical scope of the present disclosure encompasses the scope in which those skilled in the art to which the present disclosure belongs can variously modify or change the embodiments without departing from the subject matter of the present disclosure defined in the appended claims.

The invention claimed is:

1. A network device comprising:
a non-transitory memory to store instructions; and
a processor that executes on or more of the instructions to:
receive an edge service search request for a subscriber from a control node;
in response to the search request, search for an edge service which is able to be provided for processing data of the subscriber for each of interfaces of the network device; and
return a result of searching for the edge service to the control node, so as to enable the control node to apply the edge service for controlling a data session of the subscriber,
wherein the processor, when searching for the edge service, is further to:
perform signaling with each of edge nodes identified as being connected for each of the interfaces, so as to obtain service information relating to a specific edge service which satisfies a required performance for processing the data of the subscriber, the service information including a service performance value identify at least one of a bandwidth, a latency, or a quality of service (QoS); and search for the specific edge service for which the service information is obtained, as the edge service which is able to be provided for processing the data of the subscriber.

2. The network device of claim 1, wherein the edge service search request and the result of searching for the edge service are transmitted or received through a service-based interface between a data node and the control node.

3. The network device of claim 1, wherein the processor, when returning the result of searching for the edge service to the control node, is further to:
manage state information between the network device and the edge service based on the service information of the specific edge service; and
return the state information to the control node as the result of searching for the edge service for the subscriber.

4. The network device of claim 3, wherein the state information between the network device and the edge service comprises, for each of at least one edge node in which the edge service is searched, at least one of: service interface (I/F) information indicating at least one of an identifier (ID), a communication port, a node location, or an interface (I/F) of an edge node; a number of edge services available in an edge node and an edge service list; or load information generated in the network device when the edge service is provided.

5. The network device of claim 1, wherein service information relating to an edge service further comprises at least one of an edge service name, a hosting address providing the edge service, service interface (I/F) information, I/F load information, or a transmission/reception processing scheme.

6. The network device of claim 1, wherein the processor, when performing the signaling with each of the edge nodes, is further to:
provide a traffic profile of the subscriber to each of the edge node nodes so as to request each of the edge nodes to identify whether the edge service is able to be provided to the subscriber,
wherein each of the edge nodes identifies whether there is the specific edge services from service edge service services supported by each of the edge nodes, which satisfies the required performance for processing the data of the subscriber, based on the traffic profile of the subscriber; and
wherein one of the edge nodes identifying the specific edge service returns the service information relating to the specific edge service.

7. The network device of claim 6, wherein while the processor is performing the signaling with each of the edge nodes:
one of the edge node nodes identifying that the specific edge service does not exist performs signaling with another one of the edge nodes connected to the edge node, so as to obtain the service information relating to the specific edge service which satisfies the required performance for processing the data of the subscriber, and
the edge node identifying that the specific edge service does not exist returns the obtained service information of the specific edge service to the network device.

8. The network device of claim 1, wherein the processor, when searching for the edge service, is further to:
identify an interface in an active state from interfaces of the network device;

detect, for each of interfaces identified as being in the active state, an address of at least one edge node connected through the interface; and identify, for each of the interfaces, an edge node for which the address is detected as the edge node connected to the interface.

9. The network device of claim 1, wherein the edge node is located in an access node connected to the network device through an N3 interface, is located in a data node connected to the network device through an N9 interface, or is located in a separate node connected to the network device through an N6 interface.

10. An edge service search method performed by a network device, the method comprising:

receiving an edge service search request for a subscriber from a control node;

searching for an edge service which is able to be provided for processing data of the subscriber for each of interfaces of the network device in response to the search request; and returning a result of searching for the edge service to the control node so as to enable the control node to apply the edge service for controlling a data session of the subscriber, wherein the searching for the edge service comprises:

performing signaling with each of edge nodes identified as being connected for each of the interfaces, so as to obtain service information relating to a specific edge service which satisfies a required performance for processing the data of the subscriber, the service information including a service performance value identify at least one of a bandwidth, a latency, or a quality of service (QoS); and searching for the specific edge service for which the service information is obtained, as the edge service which is able to be provided for processing the data of the subscriber.

11. The edge service search method of claim 10, wherein the edge service search request and the result of searching for the edge service are transmitted or received through a service-based interface between a data node and the control node.

12. The edge service search method of claim 10, wherein returning a result of searching for the edge service to the control node comprises:

managing state information between the network device and the edge service based on the service information of the specific edge service; and returning the state information to the control node as the result of searching for the edge service for the subscriber.

13. The edge service search method of claim 10, wherein the performing of signaling with each of the edge nodes with each of the edge nodes identified as being connected for each of the interfaces comprises:

providing a traffic profile of the subscriber to each of the edge nodes so as to request each of the edge nodes to identify whether the edge service is able to be provided to the subscriber, wherein each of the edge nodes identifies whether there is the specific edge service form edge services supported by the edge node, which satisfies the required performance for processing the data of the subscriber, based on the traffic profile of the subscriber; and wherein one of the edge nodes identifying that the specific edge service returns the service information relating to the specific edge service.

14. The edge service search method of claim 10, wherein searching for the specific edge service for which the service information is obtained comprises:

identifying an interface in an active state from interfaces of the network device;

detecting, for each of interfaces identified as being in the active state, an address of at least one edge node connected through the interface; and identifying, for each of the interfaces, an edge node for which the address is detected, as the edge node connected to the interface.

* * * * *